United States Patent
Coxon

(10) Patent No.: US 9,984,404 B2
(45) Date of Patent: May 29, 2018

(54) METHOD, MEDIUM, AND SYSTEM FOR E-PRODUCT VENDING

(71) Applicant: Touch Networks Australia Pty Ltd, Melbourne, Victoria (AU)

(72) Inventor: Michael Coxon, Campbells Creek (AU)

(73) Assignee: TOUCH NETWORKS AUSTRALIA PTY LTD, Melbourne, Victoria (AU)

( * ) Notice: Subject to any disclaimer, the term of this patent is extended or adjusted under 35 U.S.C. 154(b) by 337 days.

(21) Appl. No.: 14/896,899

(22) PCT Filed: Jun. 25, 2014

(86) PCT No.: PCT/AU2014/000661
§ 371 (c)(1),
(2) Date: Dec. 8, 2015

(87) PCT Pub. No.: WO2014/205490
PCT Pub. Date: Dec. 31, 2014

(65) Prior Publication Data
US 2016/0155182 A1    Jun. 2, 2016

(30) Foreign Application Priority Data
Jun. 25, 2013 (AU) ................ 2013902324

(51) Int. Cl.
*G06Q 30/00* (2012.01)
*G06Q 30/06* (2012.01)
(Continued)

(52) U.S. Cl.
CPC ....... *G06Q 30/0635* (2013.01); *G06Q 20/123* (2013.01); *G06Q 30/06* (2013.01); *H04L 67/02* (2013.01); *H04L 67/06* (2013.01)

(58) Field of Classification Search
CPC .. G06Q 30/0635; G06Q 30/123; G06Q 30/06; H04L 67/02; H04L 67/06
See application file for complete search history.

(56) References Cited

U.S. PATENT DOCUMENTS 7,930,215 B2 * 4/2011 Pombo ............... G06Q 10/0633
705/26.1
2001/0037264 A1  11/2001 Husemann et al.
(Continued)

OTHER PUBLICATIONS http://paulbourke.net/dataformats/nff/nff1.html (Year: 1988).*
International Search Report mailed for International Application No. PCT/AU2014/000661, filed Jun. 25, 2014, 6 pages.

*Primary Examiner* — Matthew E Zimmerman
(74) *Attorney, Agent, or Firm* — Knobbe Martens Olson & Bear, LLP

(57) ABSTRACT

Disclosed is a merchant web service module arranged to communicate with a client device and an inventory system to provide a product list of vendible e-products and workflows associated with the vendible e-products to the client device, and to facilitate execution of a workflow to order an e-product by: i) receiving data indicative of a desired e-product from the client device, ii) sending an order message comprising data indicative of the desired e-product to a transacting host, iii) receiving data indicative of the actual e-product from the transacting host, iv) converting the data indicative of the actual e-product to a format neutral file that is indicative of the actual e-product, and v) and sending the format neutral file to the client device for conversion to and output of an actual e-product. A method of vending an e-product is also disclosed.

13 Claims, 7 Drawing Sheets

(51) Int. Cl.
*G06Q 20/12* (2012.01)
*H04L 29/08* (2006.01)

(56) References Cited

U.S. PATENT DOCUMENTS

| | | | |
|---|---|---|---|
| 2002/0156757 A1* | 10/2002 | Brown | G06Q 10/06 |
| 2002/0161476 A1* | 10/2002 | Panofsky | G06Q 20/1235 700/231 |
| 2004/0268451 A1 | 12/2004 | Robbin et al. | |
| 2009/0003603 A1* | 1/2009 | Wessel, Jr. | G06F 21/10 380/255 |
| 2009/0276332 A1* | 11/2009 | Gharabally | G06F 8/60 705/26.1 |
| 2011/0066843 A1 | 3/2011 | Newman et al. | |
| 2012/0158547 A1* | 6/2012 | Wood | G06Q 30/0601 705/27.1 |

\* cited by examiner

METHOD, MEDIUM, AND SYSTEM FOR E-PRODUCT VENDING

CROSS-REFERENCE TO RELATED APPLICATIONS

This application is the U.S. National Phase under 35 U.S.C. § 371 of International Application PCT/AU2014/000661, filed Jun. 25, 2014, which claims priority to Australian Patent Application No. 2013902324, filed Jun. 25, 2013. The disclosures of the above-described applications are hereby incorporated by reference in their entirety and are hereby expressly made a portion of this application.

FIELD OF THE INVENTION

The present invention is generally related to an e-product vending system and particularly, although not exclusively, related to an e-product vending system comprising an intermediary between a client and host.

BACKGROUND TO THE INVENTION

Systems exist that allow consumers to purchase certain products via receipts or vouchers that are electronically generated. Such electronic vouchers or products (herein e-products) may provide a user with mobile phone recharge credit, a retail store gift voucher, online gaming credit, online music, video or application store credit, reloadable prepaid credit card credit, or credit related to other products. E-products are often sold by merchants on behalf of vendors via a device such as an electronic cash register (ECR) using a point of sale (POS) terminal at a retail location such as a convenience store or petrol station. The device may produce a receipt for the consumer that includes information pertaining to the purchase, such as a mobile recharge code.

E-products are typically generated by a client device that is controlled by a user, such as a cashier or checkout assistant, who enters information related to the customer's desired e-product purchase. A retail location may have one or more such client devices arranged to vend e-products. Each client device typically has an associated user interface (UI) that displays product information or content to the user. Traditionally, each of the one or more client devices at a retail location must be configured to receive broadcast-manifesting UI content upon changes being made to the e-products that are available for sale.

SUMMARY OF THE INVENTION

In a first broad aspect the invention provides a merchant web service module arranged to communicate with a client device and an inventory system to provide a product list of vendible e-products and workflows associated with the vendible e-products to the client device, and to facilitate execution of a workflow to order an e-product by: i) receiving data indicative of a desired e-product from the client device, ii) sending an order message comprising data indicative of the desired e-product to a transacting host, iii) receiving data indicative of the actual e-product from the transacting host, iv) converting the data indicative of the actual e-product to a format neutral file that is indicative of the actual e-product, and v) and sending the format neutral file to the client device for conversion to and output of an actual e-product.

In an embodiment, the merchant web service module is arranged to receive the product list and workflows from a content host.

In an embodiment, the merchant web service module is arranged to deliver data indicative of the ordered e-product in a format neutral file to the client device upon confirmation that the actual e-product matches the desired e-product.

In an embodiment, the merchant web service module is arranged to facilitate rollback of an ordered e-product before confirmation that the actual e-product matches the desired e-product and delivery of the actual e-product.

In an embodiment, the merchant web service module is arranged to facilitate the return of an ordered e-product after confirmation that the actual e-product matches the desired e-product and delivery of the actual e-product.

In an embodiment, the merchant web service module is arranged to populate a template with product data indicative of the ordered e-product to produce the format neutral file.

In a second broad aspect the invention provides an e-product vending system comprising:
the merchant web service module of the first broad aspect, and
one or more client devices in remote communication with the merchant web service module.

In a third broad aspect the invention provides a method of vending an e-product comprising:
executing a product-based workflow comprising:
receiving data indicative of a desired e-product from a client device at a merchant web service module,
sending an order message comprising data indicative of the desired e-product from the merchant web service module to a transacting host,
receiving data indicative of the actual e-product from the transacting host at the merchant web service module,
converting the data indicative of the actual e-product to a format neutral file that is indicative of the actual e-product at the merchant web service module, and
sending the format neutral file to the client device for conversion to and output of an actual e-product.

In an embodiment, the method comprises delivering data indicative of the ordered actual e-product in a format neutral file to the client device upon confirmation that the actual e-product matches the desired e-product.

In an embodiment, the method comprises rolling back an ordered e-product before confirming that the actual e-product matches the desired e-product and delivering of the actual e-product.

In an embodiment, the method comprises returning an ordered e-product after confirming that the actual e-product matches the desired e-product and delivery of the actual e-product.

In an embodiment, the method comprises populating a template with product data indicative of the ordered e-product to product the format neutral file.

In a fourth broad aspect the invention provides a computer program code which when executed implements the method of the third broad aspect.

BRIEF DESCRIPTION OF THE DRAWINGS

In order that the invention may be more clearly ascertained, embodiments will now be described, by way of example, with reference to the accompanying drawing, in which.

DETAILED DESCRIPTION OF EMBODIMENTS OF THE INVENTION

The invention is generally related to an e-product vending system that is arranged to deliver e-products according to a product-based workflow. The e-product vending system is typically utilised by a merchant, for example at a retail location, to sell an e-product to a customer on behalf of a provider. Such e-products may provide a user with mobile phone recharge credit; a retail gift voucher; online gaming credit; music, video or application store credit; reloadable prepaid credit card credit; or credit related to any other suitable product. E-products may be presented to the customer as a printed receipt that includes information pertaining to the purchase, such as a mobile recharge code. However, the e-product may be presented to the customer in any suitable manner, such as via a quick response (QR) code on a display which can be scanned by a customer using a smartphone.

Figure 1:
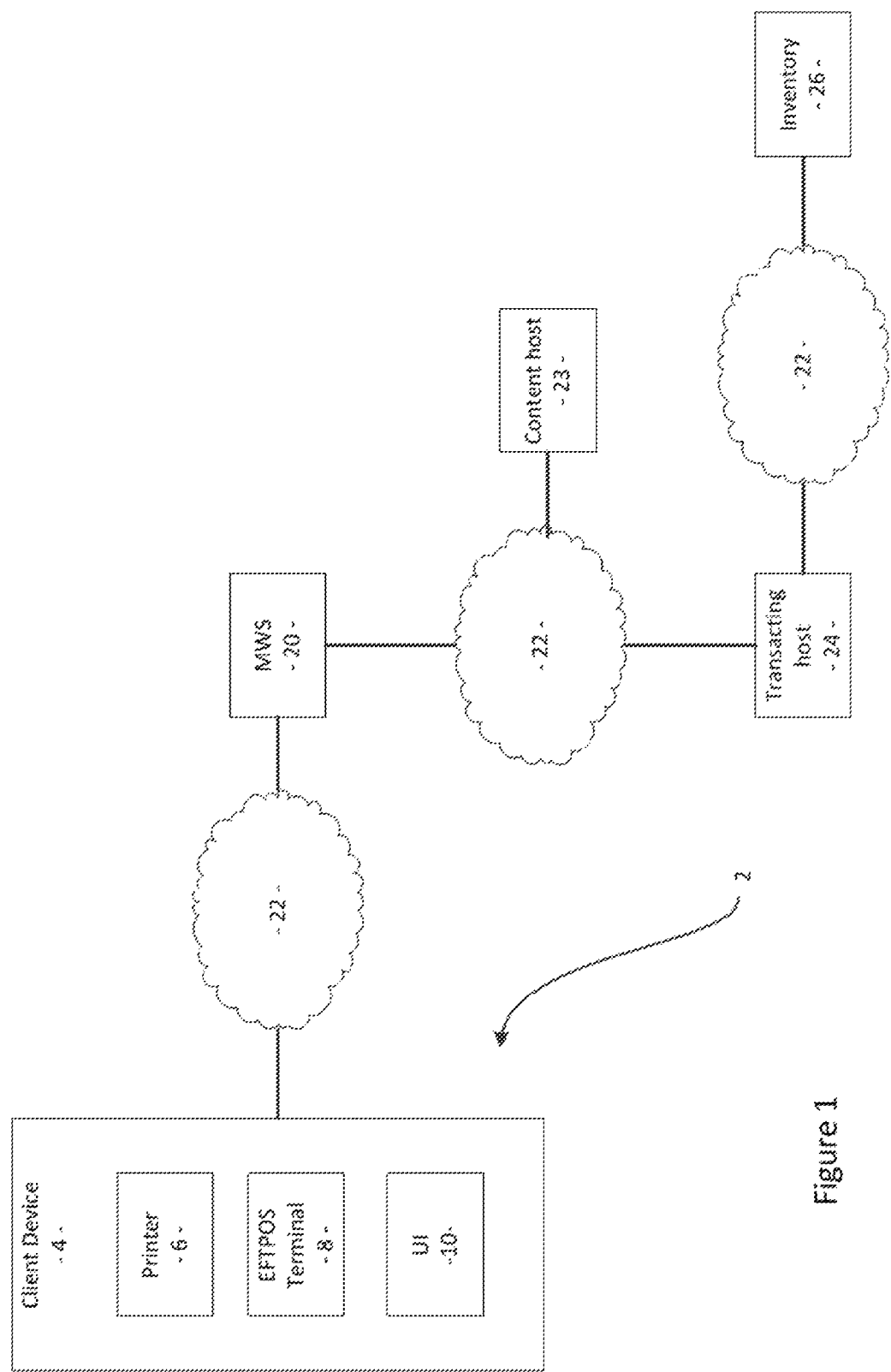
FIG. 1 is a block diagram of an embodiment of an e-product vending system of the invention.

Referring to FIG. 1, a merchant typically vends e-products from a commercial or retail location such as a convenience store or petrol station that is associated with an e-product vending system 2. The e-product vending system 2 is arranged to communicate with at least one client device 4. The client device 4 is arranged to execute a product-based workflow in order to configure an e-product order and to deliver the ordered e-product. The client device 4 may be a practice management system (PMS), an electronic cash register (ECR), a business-to-business (B2B) or point of sale (POS) terminal, or any other suitable device. The client device 4 may run any suitable operating system or platform, such as Windows, Linux, OS X, Android or iOS. The phrase "client device" is intended to include any suitable device or mechanism that may be used in the e-product vending process, and includes the terms "ECR", "PMS" and "till". The client device 4 may comprise a tablet computer or a mobile smartphone. The client device 4 is arranged to implement a suitable application programming interface (API) associated with the e-product vending system 2 in order to configure an e-product order, execute a product-based workflow and deliver the ordered e-product (this is discussed further below). The client device 4 may have an associated: i) scanner (not shown) for scanning barcodes on products for sale, such as fast-moving consumer goods (FMCG) which may include soft drinks, toiletries, grocery items and the like, ii) cash drawer (not shown) for storing cash used for cash payments, iii) printer 6 for printing customer receipts and e-products as necessary, and iv) electronic funds transfer at point of sale (EFTPOS) terminal 8 for receiving electronic payments, for example, made with a payment card such as a debit card or credit card.

The client device 4 is typically able to write a client application that is capable of: i) requesting a product list of vendible and available e-products, ii) executing a product-based workflow that is specified by the e-product desired by the customer, and iii) configuring and ordering an e-product. The client device 4 may comprise a UI 10 so that a user, such as a cashier or checkout assistant, can interact with the e-product vending system 2. The UI 10 typically comprises at least a display, but other UI 10 elements such as a numerical pad or keyboard may be provided. The display may be a touch screen or a non-touch screen. The UI 10 typically allows the user to enter information related to a purchase, such as how the customer will pay. The UI 10 also allows the user to enter information related to an e-product that a customer desires to purchase.

Figure 2:
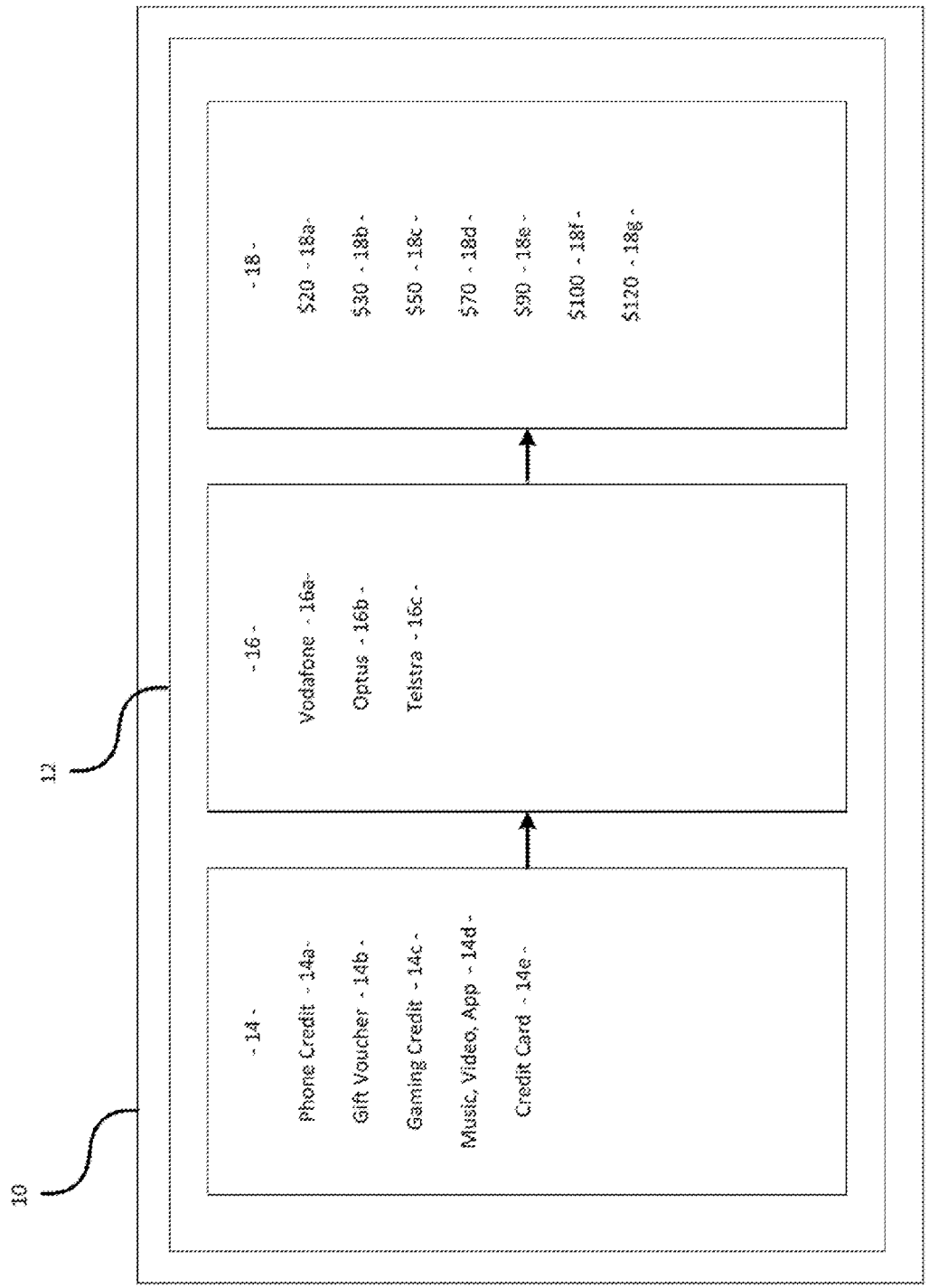
FIG. 2 is an example user interface of the client device shown in FIG. 1.

Referring to FIG. 2, in some embodiments, the UI 10 of the client device 4 comprises a display 12 that displays a first menu 14 of available e-products upon an e-product option being selected by the user (which may indicate that a customer wishes to purchase an e-product). Such e-products may include mobile phone recharge credit 14a, retail store gift vouchers 14b, online gaming credit 14c, online music, video or application store credit 14d, reloadable prepaid credit card credit 14e, or any other suitable product. A customer may wish to purchase mobile phone recharge credit from their mobile phone provider, in which case the user can select the mobile phone recharge credit 14a option, for example, by touching the display 12 or by using a keyboard, mouse or any other suitable input device. Upon selection of the mobile phone recharge credit 14a option, a second menu 16 may then display available mobile phone providers from which credit can be purchased via an e-product. (Generally, either the merchant or the vendor has a pre-existing commercial relationship with each of the e-product providers on behalf of which it sells credit. In this specification, the term "vendor" refers to the party that provides the e-product vending system 2.) For example, the second menu 16 may indicate that a customer can purchase credit from Vodafone 16a, Optus 16b or Telstra 16c. Upon the user's selection of a mobile phone provider (such as Vodafone 16a), a third menu 18 may display different denominations of credit available for purchase, such as $20 18a, $30 18b, $50 18c, $70 18d, $90 18e, $100 18f or $120 18g. Such denominations may correspond to specials or certain plans offered by the mobile phone provider.

The client device 4 is arranged to produce an e-product based on a product-based workflow and corresponding to the selection of the type of credit, the provider, and the denomination as will be explained in further detail below. The example given above is in relation to the purchase of mobile phone credit and similar menus may be displayed for other types of credit. However, the UI 10 may be provided in any suitable manner and it may or may not include a series of nested menus. LA's of other embodiments may, for example, provide buttons that correspond directly to a particular e-product.

Referring again to FIG. 1, the e-product vending system 2 comprises a merchant web service module 20 arranged to send messages to and receive messages from the client device 4. Generally, a merchant web service module 20 services a plurality of client devices 4 (although only one client device 4 is illustrated in FIG. 1), which may be provided at a plurality of different retail locations and belong to a plurality of different merchants. For example, a single merchant web service module 20 may service a single client device 4 at a petrol station, an additional three client devices at a convenience store, an additional twenty client devices at a department store, and an additional thirty client devices at a supermarket. However, a single merchant web service module 20 may service one or more client devices 4 and client devices 4 may be added to or removed from the system as required.

The merchant web service module 20 is arranged to provide a product list indicative of the vendible e-products available to a particular client device 4: the available e-products may depend on the relationship between the merchant and provider, and different client devices 4 associated with different merchants may be provided with different product lists. The merchant web service module 20 is also arranged to provide a product-specific workflow associated with each e-product with the product list; this means that each vendible e-product will have an associated workflow that is provided to the client device 4. The product list and associated workflows are provided in response to a query from the client device 4, and are provided in a guaranteed format such that the client device 4 application can be appropriately written to: i) render the product list as menus or in any other suitable manner, ii) configure an e-product order, iii) execute the workflow associated with a particular e-product, and iv) render the e-product upon delivery of the ordered e-product from the merchant web service module 20.

The merchant web service module 20 is typically provided on a server remote from the client device 4. The merchant web service module 20 may communicate with the client devices 4 (and vice versa) over a suitable network 22 such as a local area network (LAN), a wide area network (WAN) or the internet, but communication may be executed in any suitable manner. The merchant web service module 20 is typically implemented using software but alternatively may be implemented using hardware or a combination of software and hardware. The merchant web service module 20 may be implemented using any suitable computer program code or any suitable programming language. The computer program code is typically stored on a computer readable medium such a hard disk drive (HDD) or random access memory (RAM).

The merchant web service module 20 fronts an upstream inventory system that includes a content host 23, a transacting host 24, and an inventory database 26; these components are arranged to interact with the client device 4 in order to deliver a desired e-product to a customer; the merchant web service module 20 may be considered an intermediary between the client device 4 and the inventory system. The inventory system (similar to the merchant web service module 20) is typically associated with, owned or run by the vendor. In an embodiment, the content host 23 is arranged to store and provide to the MWS 20 a list of the available e-products, for example, stored in the inventory database 26. This may include e-product types, denominations and quantities. In an embodiment, the transacting host 24 has access to an inventory database 26, which includes data indicative of available e-products stored in a database. In an embodiment, the transacting host 24 is arranged to contact a provider in order to retrieve data indicative of an e-product. Typically, the product-specific workflow and e-product data are specified by the provider, but vended through the transacting host 24 and merchant web service module 20.

Figure 3:
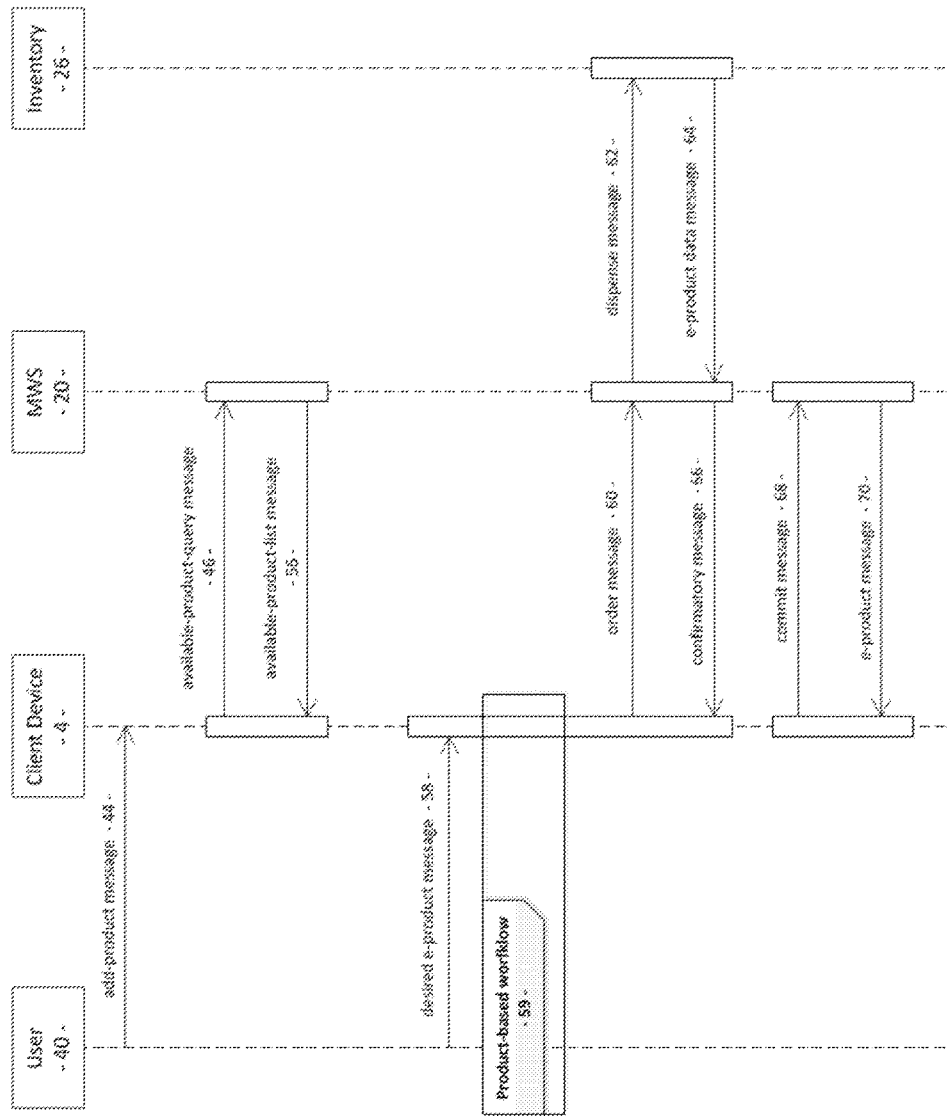
FIG. 3 is a sequence diagram of an embodiment of the invention.

FIG. 3 is a sequence diagram that illustrates an embodiment that allows a user 40, such as a checkout clerk, to generate an e-product. In this embodiment, the user 40 sends an add-product message 44 that is received by the client device 4 that indicates that an e-product is to be sold to a customer, along with any other products the customer wishes to purchase, such as FMCG goods. Upon receiving the add-product message 44, the client device 4 sends an available-product-query message 46 to the merchant web service module 20 that indicates that a list of available e-products is required at the client device 4. The available-product-query message 46 may comprise a device identifier corresponding to the actual client device 4 being used, and may also comprise a merchant identifier corresponding to the merchant requesting the list of available e-products. Certain client devices 4 may be unable to vend certain e-products due to the relationships between merchants and providers, hardware restrictions, or for other reasons. As such, the merchant web service module 20 requires an indication of the device in use and an indication of the merchant requesting the product list in order to return an accurate list of available e-products.

The merchant web service module 20 is arranged to send an available-product-list message 56 to the client device 4 that comprises the data indicative of a list of available products, where such data may be procured in association with the transacting host. The client device 4 is arranged to receive the available-product-list message 56 and to process it in order to output a list of available e-products. The client device 4 outputs a list of available or vendible e-products as indicated by the merchant web service module 20 or transacting host 24 or both in any suitable manner such as by displaying the list on the display.

Figure 4:
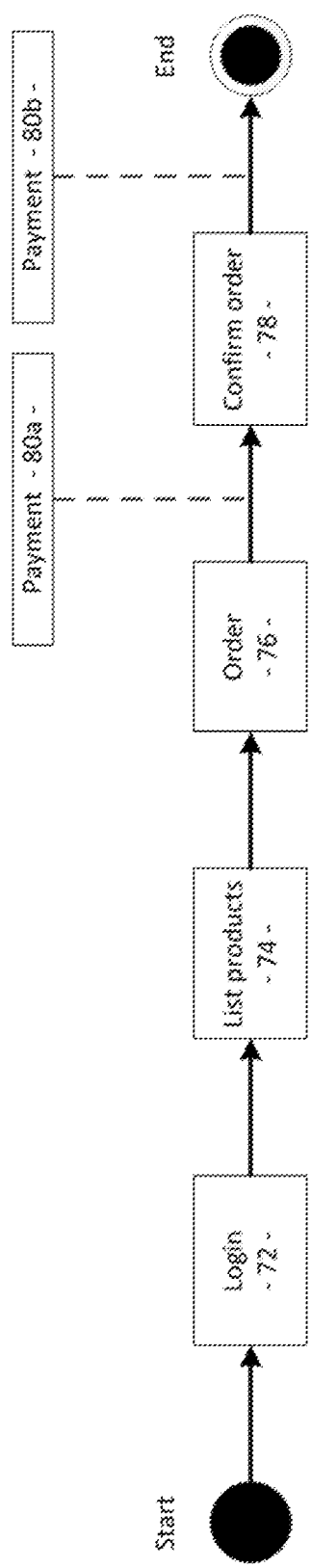
FIG. 4 is a product-based workflow of a method of successfully delivering an e-product according to an embodiment of the invention.
Figure 5:
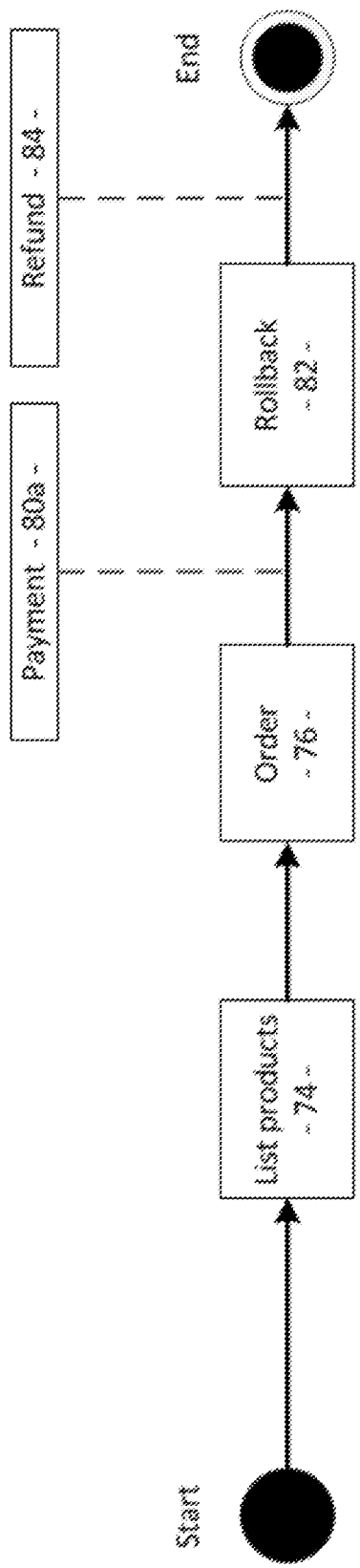
FIG. 5 is a product-based workflow of a method of rolling back an e-product according to an embodiment of the invention.
Figure 6:
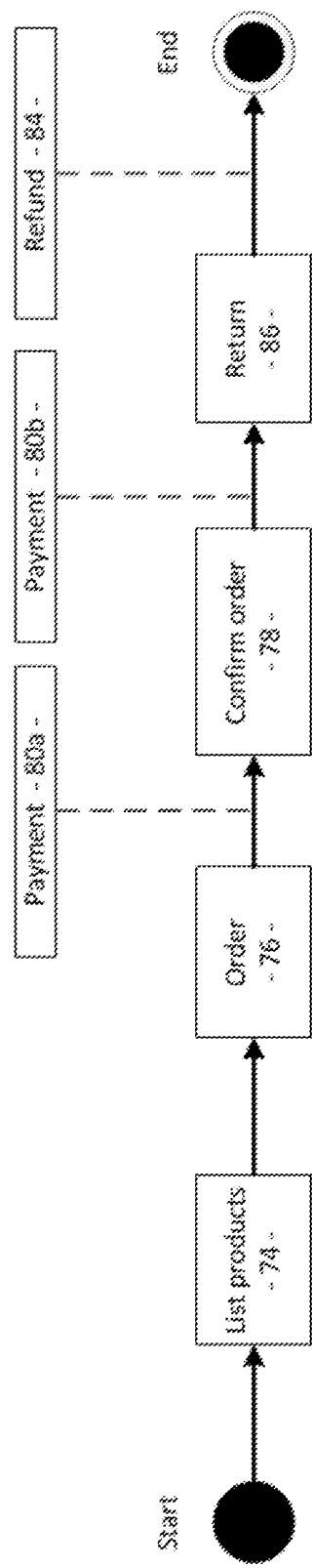
FIG. 6 is a product-based workflow of a method of returning an e-product according to an embodiment of the invention.

The client device 4 outputting the list of available e-products may prompt the user 40 to select a particular e-product as desired by the customer. The user 40 may send a desired e-product message 58 to the client device 4 by inputting their selection in any suitable manner such as by using the UI. The desired e-product message 58 indicates to the client device 4 the desired e-product and its characteristics such as the mobile phone provider, denomination and quantity of such e-products in the case of a mobile recharge credit product, though any suitable e-product may be delivered. Upon receiving the desired e-product message 58, the client device 4 sends an order message 60 to the merchant web service module 20, which comprises data indicating the characteristics of the desired e-product such as the item and quantity, which may be provided as variables. The product-based workflow 59 associated with a particular e-product that is brought down from the merchant web service module 20 (for example, at the same time the product list is brought down) may be implemented to configure and order an e-product. (FIGS. 4 to 6 illustrate particular product-based workflows that are discussed below.)

In an embodiment, the client device 4, in executing a product-based workflow 59, may sends an order message 60 to the merchant web service module 20, which is arranged to receive and process the order message 60 and to assemble or generate a new message based on it. Upon receiving the order message 60, the merchant web service module 20 generates and sends a dispense message 62 to the inventory database 26 or provider (not shown), via the transacting host (not shown); the dispense message 62 similarly comprises data indicative of the desired e-product.

The merchant web service module 20 and transacting host are further arranged to procure from inventory 26 or generate actual e-product data that is indicative of the desired e-product. The actual e-product data comprises data that can be converted to an e-product receipt for vending to a customer and may include data related to a serial number, PIN, barcode information, expiry date or any other suitable information. An e-product data message 64 is sent to the merchant web service module 20 via the transacting host.

The merchant web service module 20 is arranged to receive the e-product data message 64 and to process it in order to determine the actual e-product data or file. The merchant web service module 20 is further arranged to send a confirmatory message 66 to the client device 4 that indicates the actual e-product and the characteristics thereof. The client device 4 may then check that the actual e-product indicated by the confirmatory message 66 matches the desired e-product ordered in message 60; an error or non-commit signal or message may be returned upon determining a mismatch. Upon receiving the confirmatory message 66, the client device 4 may send a commit message 68 which may comprise the device identifier to the merchant web service module 20; the commit message 68 comprises data that indicates to the merchant web service module 20 that the order is to be confirmed and delivered.

The merchant web service module 20 is arranged to receive and process the commit message 68. Upon receiving the commit message 68, the merchant web service module 20 may send an e-product message 70 back to the client device 4 that comprises the actual e-product data or file. The client device 4 is arranged to receive and interpret the actual e-product data or file and to convert it to and output the actual e-product (for example, as a receipt) for delivery by the user to the customer.

Referring to FIG. 4, in an embodiment, a user may invoke a sequence or product-based workflow such as that illustrated in FIG. 3 by initially logging in 72 to a client device, and this may be done at any suitable time such as the start of a user's work shift. Logging in 72 may require user identification, for example, by entering a username and password, scanning an identification card, scanning their finger with a fingerprint reader, or in any other suitable manner.

The client device is arranged to interrogate the merchant web service module in response to input from the user (typically after receiving a request for a desired e-product from a customer) in order to receive and display a product list 74 that indicates the available e-products. Such user input triggers a series of messages between the client device, merchant web service module and transacting host (such as messages 46 and 56 as illustrated in FIG. 3). The user may select (see message 58 in FIG. 3) the desired e-product from the displayed product list 74, triggering a series of messages (such as messages 60, 62, 64 and 66 in FIG. 3) arranged to order 76 the desired e-product, which the merchant web service module 20 and transacting host generate or retrieve from inventory. The client device may display the ordered 76 e-product to the user for confirmation 78. However, the client device may automatically confirm 78 the order 76 upon determining matching desired and ordered 76 e-product characteristics. Confirmation 78 of the order may trigger another series of messages (such as messages 68 and 70 in FIG. 3) that commits to the order, causing delivery of the actual e-product in any suitable manner.

The user may require payment from the customer in order to complete the transaction, and payment may happen at any suitable point of the transaction. In some embodiments, the client device may be arranged to pause the transaction at any suitable point until it receives an indication or confirmation that payment has been made. For example, the customer may be required to pay 80a after the order 76 has been made but before the order is confirmed 78. Alternatively, the customer may be required to pay 80b after the order has been confirmed 78 and the actual e-product has been delivered. However, payment may be taken in any suitable manner.

Referring to FIG. 5, in some embodiments, the e-product vending system may allow a user to indicate that an ordered 76 e-product is no longer desired. The user may login to a client device (not shown in FIG. 5) and command the system to display a product list 74. The user may order 76 the desired e-product as described above. However, the user may be presented with a rollback 82 option that allows for a customer to change their mind about the purchase before the order 76 has been confirmed. The client device may allow for the user to indicate that a rollback 82 is required, for example, by providing a suitable input mechanism on the UI. In embodiments where the user manually confirms the order 76, the rollback 82 input mechanism may be available concurrently with a confirm-input mechanism, allowing the user to select one of the two options. In embodiments where the system automatically confirms the order 76, the rollback 82 mechanism may be available or responsive up until the order 76 has been confirmed. Upon the user commanding a rollback 82 of a no-longer-desired e-product, the system may facilitate the sending of a series of messages between the client device, merchant web service module and transacting host such that the inventory database and other associated databases are returned to their initial state (i.e. their state before the transaction started), meaning that the particular no-longer-desired e-product may be available for purchase at a later time.

The client device may be arranged to refund 84 all or part of the customer's payment in embodiments where payment 80a has been made before the rollback 82 has been commanded.

Referring to FIG. 6, in some embodiments, the e-product vending system may allow a user to indicate that a confirmed 78 and delivered e-product is to be returned 86 to the merchant, provider or vendor, in which cases payment may be refunded 84. Typically, the customer will not have activated or used the e-product, for example by topping up the credit on their mobile phone, in order to have it returned and refunded.

The user may log in to a client device (not shown in FIG. 5) and command the system to display a product list 74. The user may order 76 and confirm 78 the desired e-product as described above, such that an actual e-product is delivered to the customer. The user may be presented with a return 86 option that allows the unused e-product to be invalidated. The return option may be offered immediately after delivery of the e-product or any suitable time thereafter, such as up to 30 days later. The client device may allow the user to indicate that a return 86 is required, for example, by providing a suitable input mechanism on the UI. Upon the user commanding the return 86 of an actual e-product, the system may send a series of messages between the client device, merchant web service module and transacting host. Upon receiving indication of the return 86, the transacting host may perform a check to see that the particular vended e-product in question has not been activated or used; the check may require communication with provider or vendor servers or may be completed in any suitable manner. The vended e-product may be returned to stock for purchase at a later time or permanently cancelled by the transacting host upon successfully determining that e-product has not been activated or used.

The client device may be arranged to refund 84 all or part of the customer's payment in embodiments where payment 80a, 80b has been made before the return 86 has been commanded.

Figure 7:
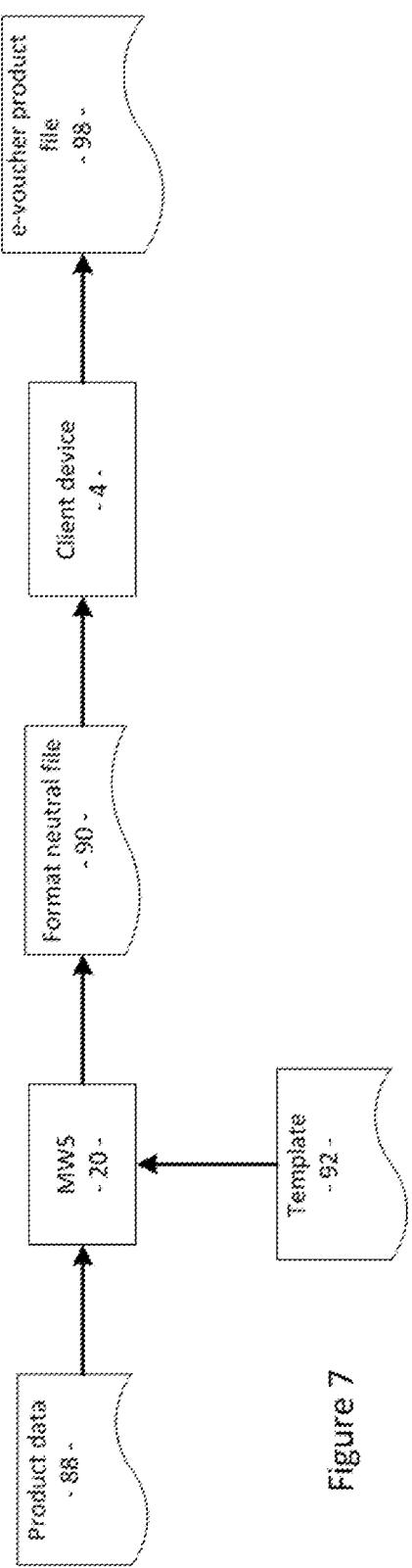
FIG. 7 is a block diagram showing file format conversion according to an embodiment of the invention.

Referring to FIG. 7, different embodiments may have different client devices 4 that output the e-product in different formats such as graphics interchange format (GIF), JPEG, bitmap image file (BMP), PostScript (PS), portable document format (PDF), or any other suitable format. However, the different client devices 4 of the different embodiments may be required to output the e-product according to a particular layout specified by the provider, and the logos and layout may change from provider to provider.

The transacting host (not shown in FIG. 7) that is fronted by and provides product data 88 to the merchant web service module 20 comprises an template 92 (such as an XSL-FO template), for example, defined by the provider. The transacting host is arranged to send the template 92 to the merchant web service module 20, which upon receipt, populates the template 92 with the product data 88 such that a format neutral file 90 indicative of the e-product is created. The format neutral file 90 is sent to the client device 4, which renders an e-product receipt 98 into its chosen output format, such as one of those listed above. The client device 4 may be arranged to display or print the e-product receipt 98 in any suitable manner.

The e-product vending system described may be advantageous because no periodic manifest process is required; a manifest process can take a long time and requires that each client device is online at the manifest process time. Further, e-product information can be out of date until a new manifest is performed. The e-product vending system described may be advantageous because an up-to-date product list may be delivered in real time.

It will be understood to persons skilled in the art of the invention that many modifications may be made without departing from the spirit and scope of the invention.

In the claims that follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art is referred to herein, such reference does not constitute an admission that such prior art forms a part of the common general knowledge in the art, in Australia or any other country.

What is claimed is:

1. An e-product vending system for vending an e-product of a provider to a consumer at a merchant location of a merchant, the electronic product vending system comprising:
    a merchant web service module arranged to communicate through an API with a client device maintained by the merchant at the merchant location and an inventory system remote from the merchant location, to provide vendible e-products and workflows associated with the vendible e-products to the client device, and to execute a workflow to order the vendible e-products by:
        i) receiving a product query message comprising a client device identifier of the client device and a merchant identifier of the merchant;
        ii) determining one or more e-products capable of being vended by the client device based upon hardware restrictions of the client device, the client device identifier, and the merchant identifier;
        iii) sending an order message comprising data indicative of a desired e-product selected from the determined one or more e-products to a transacting host;
        iv) receiving, from the transacting host, e-product data of the desired e-product and a template defined by the provider;
        v) creating a format neutral file of the desired e-product using the e-product data and template defined by the provider; and
        vi) sending the format neutral file to the client device for the client device to create an actual e-product using the format neutral file, wherein the actual e-product satisfies the hardware restrictions of the client device.

2. The e-product vending system as claimed in claim 1 arranged to receive a list of the vendible e-products and workflows from a content host.

3. The e-product vending system as claimed in claim 1 arranged to deliver data indicative of the desired e-product in the format neutral file to the client device upon confirmation that the e-product data matches the desired e-product.

4. The e-product vending system as claimed in claim 1 arranged to facilitate rollback of an ordered e-product before confirmation that the e-product data matches the desired e-product and delivery of the e-product.

5. The e-product vending system as claimed in claim 1 arranged to facilitate the return of an ordered e-product after confirmation that the e-product data matches the desired e-product and delivery of the e-product.

6. The e-product vending system as claimed in claim 1 arranged to populate the template with the e-product data to create the format neutral file.

7. The e-product vending system as claimed in claim 1, wherein the client device is in remote communication with the merchant web service module.

8. A method of e-product vending of an e-product of a provider to a consumer at a merchant location of a merchant, the method comprising:
    communicating through an API, by a merchant web service module, with a client device maintained by the merchant at the merchant location and an inventory system remote from the merchant location, and providing vendible e-products and workflows associated with the vendible e-products to the client device, and executing a workflow to order the vendible e-products by:
        i) receiving a product query message comprising a client device identifier of the client device and a merchant identifier of the merchant;
        ii) determining one or more e-products capable of being vended by the client device based upon hardware restrictions of the client device, the client device identifier, and the merchant identifier;
        iii) sending an order message comprising data indicative of a desired e-product selected from the determined one or more e-products to a transacting host;
        iv) receiving, from the transacting host, e-product data of the desired e-product and a template defined by the provider;
        v) creating a format neutral file of the desired e-product using the e-product data and template defined by the provider; and
        vi) sending the format neutral file to the client device for the client device to create an e-product using the format neutral file, wherein the actual e-product satisfies the hardware restrictions of the client device.

9. The method of e-product vending as claimed in claim 8 comprising delivering data indicative of the desired e-product in the format neutral file to the client device upon confirmation that the e-product data matches the desired e-product.

10. The method of e-product vending as claimed in claim 8 comprising rolling back an ordered e-product before confirming that the e-product data matches the desired e-product and delivering of the e-product.

11. The method of e-product vending as claimed in claim 8 comprising returning an ordered e-product after confirming that the e-product data matches the desired e-product and delivery of the e-product.

12. The method of e-product vending as claimed in claim 8 comprising populating the template with the e-product data to create the format neutral file.

13. A non-transitory computer readable media for e-product vending of an e-product of a provider to a consumer at a merchant location of a merchant, the method comprising:

communicating through an API, by a merchant web service module, with a client device maintained by the merchant at the merchant location and an inventory system remote from the merchant location, and providing vendible e-products and workflows associated with the vendible e-products to the client device, and executing a workflow to order the vendible e-products by:

i) receiving a product query message comprising a client device identifier of the client device and a merchant identifier of the merchant;

ii) determining one or more e-products capable of being vended by the client device based upon hardware restrictions of the client device, the client device identifier, and the merchant identifier;

iii) sending an order message comprising data indicative of a desired e-product selected from the determined one or more e-products to a transacting host;

iv) receiving, from the transacting host, e-product data of the desired e-product and a template defined by the provider;

v) creating a format neutral file of the desired e-product using the e-product data and template defined by the provider; and vi) sending the format neutral file to the client device for the client device to create an e-product using the format neutral file, wherein the actual e-product satisfies the hardware restrictions of the client device.

* * * * *